(12) United States Patent
Beguin et al.

(10) Patent No.: US 9,787,939 B1
(45) Date of Patent: Oct. 10, 2017

(54) DYNAMIC VIEWING PERSPECTIVE OF REMOTE SCENES

(71) Applicant: Amazon Technologies, Inc., Seattle, WA (US)

(72) Inventors: Julien George Beguin, San Francisco, CA (US); Eric Alan Breitbard, Oakland, CA (US); Robert Steven Murdock, Fairfax, CA (US); Meng Li, San Francisco, CA (US); Michael Douglas McQueen, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 216 days.

(21) Appl. No.: 14/547,892

(22) Filed: Nov. 19, 2014

(51) Int. Cl.
*H04N 7/14* (2006.01)

(52) U.S. Cl.
CPC .................... *H04N 7/141* (2013.01)

(58) Field of Classification Search
CPC combination set(s) only.
See application file for complete search history.

(56) References Cited

U.S. PATENT DOCUMENTS

| | | | |
|---|---|---|---|
| 6,778,207 B1* | 8/2004 | Lee ..................... | H04N 5/23238 348/36 |
| 8,587,653 B1* | 11/2013 | Vidunas ................. | H04N 5/247 348/143 |
| 8,774,536 B1* | 7/2014 | Jia ......................... | G06F 9/4445 382/232 |
| 2001/0017650 A1* | 8/2001 | Bober ..................... | H04N 19/17 348/158 |
| 2011/0254914 A1* | 10/2011 | Ng .......................... | H04N 21/42202 348/14.16 |
| 2014/0177720 A1* | 6/2014 | Zhang ..................... | H04N 19/52 375/240.16 |

\* cited by examiner

*Primary Examiner* — Duc Nguyen
*Assistant Examiner* — Assad Mohammed
(74) *Attorney, Agent, or Firm* — Lee & Hayes, PLLC

(57) ABSTRACT

Video conferencing is performed using near-end and far-end devices at near-end and far-end sites, respectively. Each device has a display surface and a video camera. The view of the far-end scene displayed by the near-end device is selected as a function of the position of the near-end user relative to the near-end device. As the near-end user moves toward the left, the view pans toward the right of the far-end scene. As the near-end user moves toward the right, the view pans toward the left of the far-end scene.

19 Claims, 6 Drawing Sheets

DYNAMIC VIEWING PERSPECTIVE OF REMOTE SCENES

BACKGROUND

Video conferencing between two locations may be used in various environments, including homes and businesses. In a home environment, video conferencing may allow geographically distance family members to interact through both vision and sound, creating an experience that resembles face-to-face conversations.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Described herein are systems, devices, and techniques for video conferencing between near-end and far-end sites. In an example embodiment, a video hub is located at each of the sites. Each video hub comprises a display panel and a video camera. The far-end video hub captures video of a far-end scene and transmits the video to the near-end video hub. The near-end video hub captures video of a near-end scene and transmits the near-end video to the far-end device for display at the far-end site. At the near-end site, the displayed view of the far-end scene is selected and changed as a function of the position of the near-end user so that a dynamic viewing perspective of the far-end scene is presented on the display of the near-end video hub. As the user moves to the left, the view of the far-end scene moves toward the right. As the user moves to the right, the view of the far-end scene moves toward the left.

In certain embodiments, the near-end video hub analyzes near-end video to determine the viewing angle of the near-end user relative to the near-end video hub. The viewing angle of the near-end user is used as the basis for selecting the displayed view of the far-end scene. When the viewing angle of the user is toward the right side of the near-end video hub, the view of the far-end scene is selected to show the left side of the far-end scene. When the viewing angle of the user is toward the left side of the near-end video hub, the view of the far-end scene is selected to show the right side of the far-end scene. If the near-end user moves in a right-hand direction, the view of the far-end scene is panned to the left as the user moves. If the near-end user moves in a left-hand direction, the view of the far-end scene is panned to the right as the user moves.

In some implementations the view of the far-end scene may correspond to an area of the scene that varies in size depending on the distance of the user from the near-end display. As the user move toward the near-end display, the area of the far-end scene represented by the displayed view is enlarged. As the user moves away from the near-end display, the area of the far-end scene represented by the displayed view is shrunk.

Manipulating the view of the far-end scene in this manner simulates the experience of looking through a window from the near-end site to the far-end site.

Figure 1:
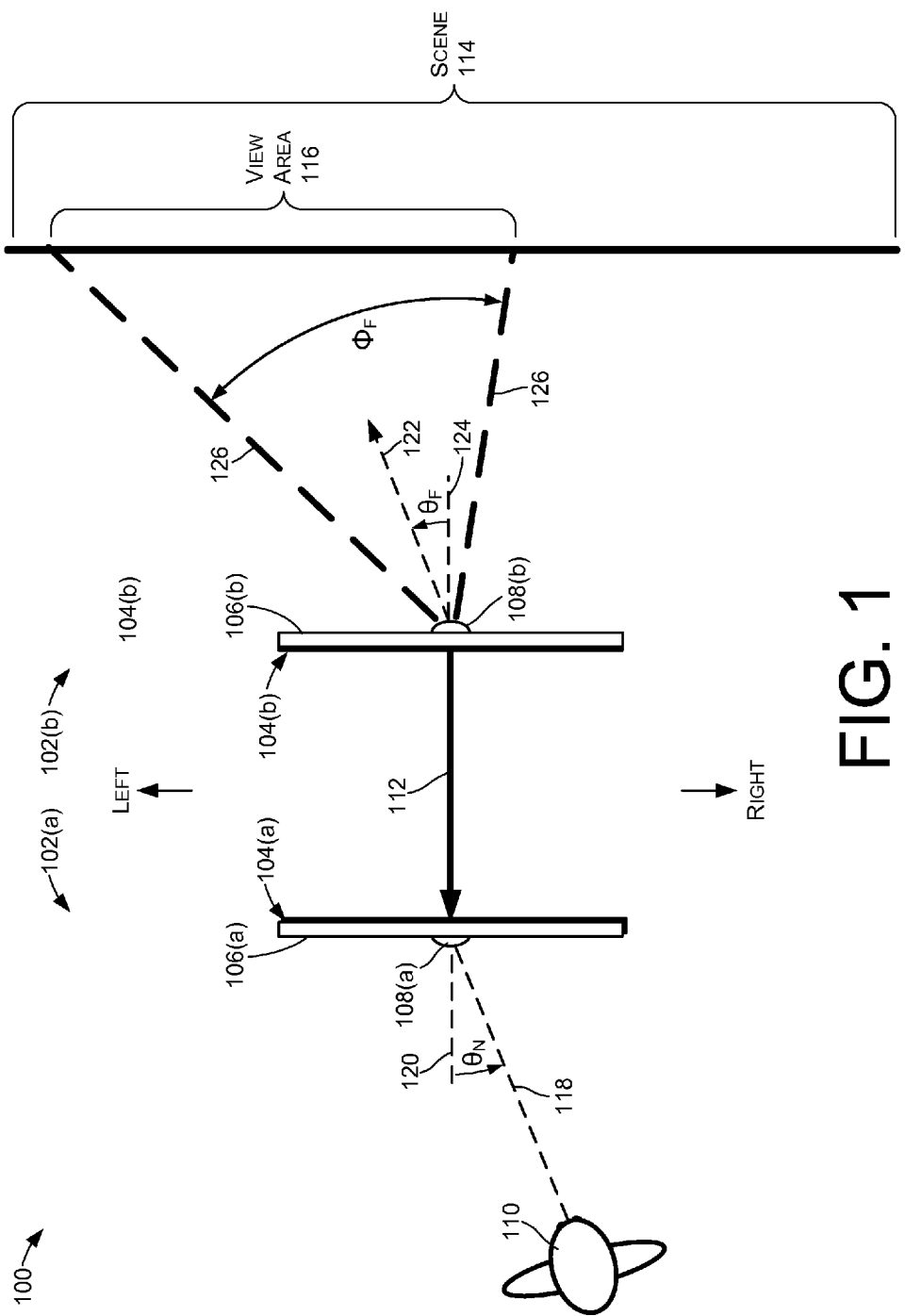
FIG. 1 is a block diagram illustrating a user and an example system that includes video conferencing hubs mounted at near-end and far-end sites, respectively.

FIG. 1 shows an example implementation 100 in which video conferencing is performed between a near-end site 102(*a*) and a far-end site 102(*b*). The near-end site 102(*a*) has a near-end video hub 104(*a*). The far-end site 102(*b*) has a far-end video hub 104(*b*). Each video hub 104 comprises a display or display panel 106 and one or more video cameras 108. In the illustrated embodiment, the near-end video hub 104(*a*) has a near-end display panel 106(*a*) and a near-end camera 108(*a*) that is at the lateral center of the near-end display surface 106(*a*). The far-end video hub 104(*b*) has a far-end display panel 106(*b*) and a far-end camera 108(*b*) that is at the lateral center of the far-end display surface 106(*b*).

The two video hubs 104(*a*) and 104(*b*) may communicate with each other over a wide-area network such as the Internet. In some cases, communications between the hubs 104 and some of the functionality described herein may be supported by one or more network-based or cloud-based services (not shown), which may provide services to multiple video hubs 104 located in homes of different users or families.

The two video hubs 104(*a*) and 104(*b*) may be configured to perform two-way audio and video communications, allowing members of two households to see and hear each other. Near-end video and audio are captured by the near-end video hub 104(*a*) and transmitted from the near-end video hub 104(*a*) to the far-end video hub 104(*b*). The far-end video hub 104(*b*) receives and plays the near-end video and audio. Far-end video and audio are captured by the far-end video hub 104(*b*) and transmitted from the far-end video hub 104(*b*) to the near-end video hub 104(*a*). The near-end video hub 104(*a*) receives and plays the far-end video and audio.

A video hub 104 may be mounted or located in a room of a home for convenient, always-on access to multiple members of a household. For example, a video hub 104 may be mounted in a central location or activity center of the home such as a kitchen, living room, or family room. The video hub 104 may be mounted so as to be easily visible to one or more users during normal activities within the room such as eating, talking, studying, preparing food, and so forth. The described techniques may also be used in business environments and by equipment designed for use in dedicated conference rooms or offices.

FIG. 1 shows a top view of the video conferencing components and a near-end user 110. The description herein will focus on the presentation at the near-end video hub 104(*a*) of far-end video 112 provided by the far-end video hub 104(*b*), although operation may be bidirectional and each hub may operate in the same way to display video provided by the other hub.

Generally, the near-end video hub 104(*a*) is configured to display a selected view of a scene 114 that is at the far-end site 102(*b*), wherein the displayed view is a video representation of a view area 116 of the scene 114. The video 112 produced and provided by the far-end camera 108(a) includes the selected view of the scene 114. In some implementations, the video 112 may include or represent the entire scene 114, and a region of the video 112 corresponding to the view area 116 may be cropped or otherwise extracted from the video 112 to produce the displayed view. In other implementations, the video 112 may be configured by the far-end video hub 104(b) to include or represent only the view area 116.

Figure 2:
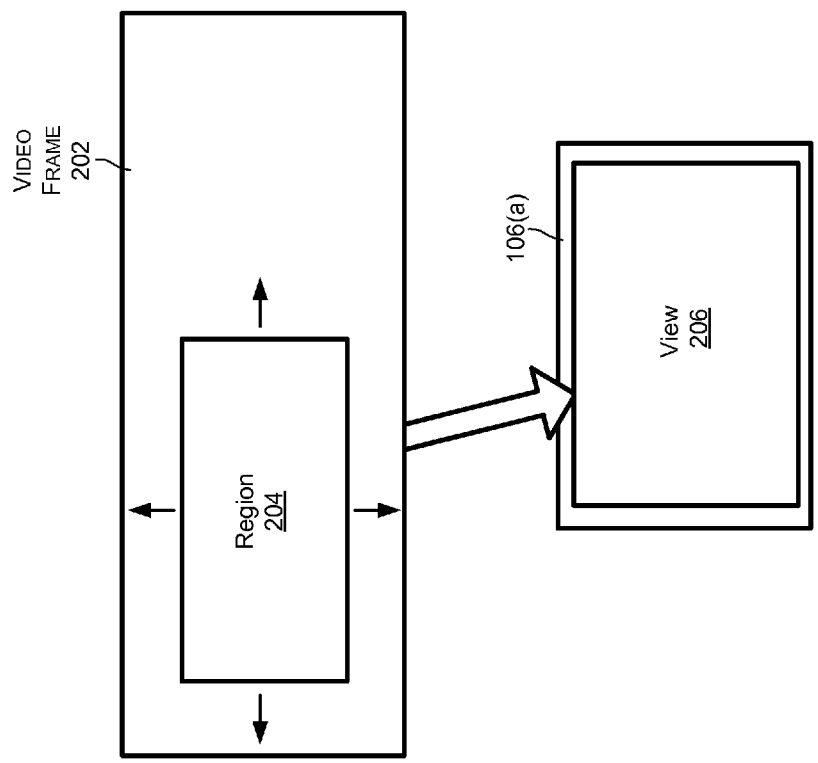
FIG. 2 is a diagram illustrating how far-end video may be cropped for display by a near-end device.

FIG. 2 illustrates an example of how a view of the scene 114 may be produced and displayed. FIG. 2 illustrates a video frame 202 of the video 112. The video frame 202 comprises an image of the entire scene 114. A region 204 of the video frame 202 corresponds to the view area 116 of the scene 114. The region 204 is cropped or otherwise extracted from each video frame 202 of the far-end video 112 to produce a view 206. The view 206 thus comprises video corresponding to the view area 116.

The view area 116 and the corresponding region 204 are selected based on the position of the near-end user 110 relative to the near-end video hub 104(a). In the example of FIG. 1, the position of the user 110 is evaluated in terms of an angle of the user from the center of the display surface 106(a). More specifically, the lateral position of the user 110 relative to the display surface 106(a) defines a near-end viewing angle $\theta_N$ relative to the lateral center of the display surface 106(a). The near-end viewing angle $\theta_N$ is the angle between a first ray 118 and a second ray 120. The first ray 118 extends from the camera 108(a), at the lateral center of the display surface 106(a), to the user 110. The second ray 120 extends orthogonally from the lateral center of the display surface 106(a). The second ray 120 may be referred to as the orthogonal centerline of the display surface 106(a).

A far-end view direction 122 extends from the far-end camera 108(b) at a far-end view angle $\theta_F$ relative to a ray 124 that extends orthogonally from the far-end camera 108(b). The ray 124 may be referred to as the orthogonal centerline of the display surface 106(b).

The view-area 116 is defined in part by the far-end view direction 122 and in part by a far-end field-of-view (FOV) that is centered about the view direction 122. The far-end FOV is indicated in FIG. 1 by the dashed lines 126. The far-end FOV has an FOV angle $\phi_F$, which may in some cases be a constant, pre-configured value. In other cases, as will be described below, the far-end FOV angle $\phi_F$ may be determined as a function of the distance of the user 110 from the near-end display surface 106(a).

The far-end view angle $\theta_F$ is calculated as a function of the near-end viewing angle $\theta_N$. In some implementations, the far-end view angle $\theta_F$ may be calculated as a linear function of the near-end viewing angle $\theta_N$. For example, the far-end view angle $\theta_F$ may be calculated as $\theta F = \theta N$, where k is a constant. In some cases the far-end view angle $\theta_F$ may be equal to the near-end viewing angle $\theta_N$ (i.e., k=1). In some cases the far-end view angle $\theta_F$ may be calculated as a non-linear function of the near-end viewing angle $\theta_N$.

The near-end video hub 104(a) tracks the near-end viewing angle $\theta_N$ over time to continuously monitor the position of the user 110, to continually update the far-end view angle $\theta_F$, to continually update the position of the viewing area 116 relative to the scene 114, to continually update the position of the region 204 relative to the video frame 202, and to continually display the view 206 corresponding to the view area 116.

Because of the described technique for calculating the far-end view angle $\theta_F$ based on the near-end viewing angle $\theta_N$, lateral movement of the user relative to the display surface results in a lateral movement of the region 204. Vertical movement of the user relative to the display surface results in a vertical movement of the region 204. More specifically:

a lateral or horizontal change in the viewing angle $\theta_N$ toward the right of the display surface produces a leftward change in the position of the region 204 relative to the video frame 202;

a lateral or horizontal change in the viewing angle $\theta_N$ toward the left of the display surface produces a rightward change in the position of the region 204 relative to the video frame 202;

a vertical change in the viewing angle $\theta_N$ toward the bottom of the display surface produces an upward change in the position of the region 204 relative to the video frame 202; and a vertical change in the viewing angle $\theta_N$ toward the top of the display surface produces a downward change in the position of the region 204 relative to the video frame 202.

"Leftward" and "rightward" as used with respect to the near-end site 102(a) are relative to the left and right edges or sides of the near-end video hub 104(a), from the perspective of the user 110 who is facing the near-end display surface 106(a). "Leftward" and "rightward" as used with respect to the scene 114 are from the perspective of the far-end camera 108(b). "Leftward" and "rightward" as used with respect to video or video frames are from the perspective of a viewer of the video or video frame.

Although the preceding description relates to horizontal panning of the region 204 and view 206 in response to lateral movement of the user 110, similar techniques may be used to vertically move the view 206 in response to vertical movement of the user 110 or to vertical movement of the head or eyes of the user 110. For example, the view area 116 may move upwardly through the scene 114 in response to downward movement of the user 110 and the view area 116 may move downwardly through the scene 114 in response to upward movement of the user 110.

Figure 3:
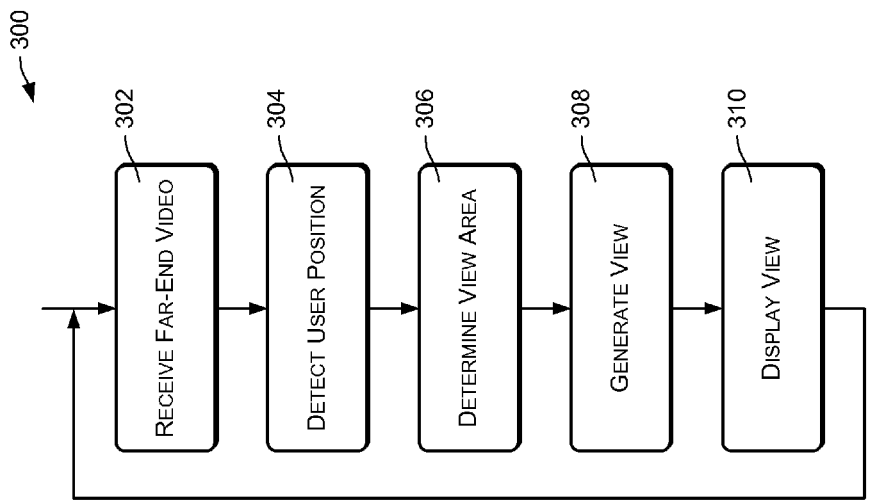
FIG. 3 is a flow diagram illustrating an example method of displaying far-end video at a near-end device.

FIG. 3 illustrates an example method 300 that may be performed by the near-end video hub 104(a) for displaying far-end video, in accordance with the techniques illustrated by FIGS. 1 and 2.

An action 302 comprises receiving the far-end video 112 from the far-end video hub 104(b), where the video 112 includes the view 206. In some implementations, the view 206 may comprise the region 204 of the video 112 corresponding to the view area 116 of the scene 114. In other implementations, the video 112 may itself comprise the view 206 and may represent the view area 116. For example, the far-end video 112 may be cropped by the far-end video hub 104(b) so that the far-end video 112 represents only the view area 116.

An action 304 comprises determining or detecting the position of the near-end user 110 relative to the near-end display surface 106(a). Generally, the position may comprise one or more of a lateral position of the user 110 relative to the display surface 106(a), a distance of the user 110 from the display surface 106(a), and/or an angular position of the user 110 relative to the display surface 106(a). In the embodiment of FIG. 1, the action 304 comprises determining the near-end viewing angle $\theta_N$ of the near-end user 110.

The action 304 may comprise performing object recognition on near-end video or on frames of the near-end video provided by the near-end camera 108(a) to detect the user 110. More generally, detecting the near-end user 110 and the near-end viewing angle $\theta_N$ may be based on visual images, depth images, or other types of sensor data that may be provided by various types of sensors of the near-end video hub 104(a). Alternatively, or in addition, some embodiments may use audio techniques such as sound source localization (SSL) to determine the position or viewing angle of the near-end user 110. Some embodiments may utilize tracking devices that are carried by the near-end user 110.

An action 306 comprises determining or selecting the view area 116 of the far-end scene 114 based the detected position of the near-end user 110. In the embodiment of FIG. 1, the view area 116 is selected based on the near-end viewing angle $\theta_N$. More specifically, the far-end view angle $\theta_F$ is calculated as a function of the near-end viewing angle $\theta_N$. The far-end viewing angle $\theta_F$ defines the view direction 122, which points to the center of the view area 116. The view area 116 is also defined by the far-end FOV angle $\phi_F$, which may be a fixed angle or which may vary in accordance with the distance of the user 110 from the near-end display surface 106(a).

An action 308 comprises generating the view 206. In the described embodiment, the action 308 may comprise cropping or extracting the region 204 of the received video 112 corresponding to the view area 116 to create video corresponding to the view area 116. In other embodiments, the action 308 may comprise controlling the far-end video hub 104(b) to that the received video 112 represents only the view area 116. For example, the far-end camera 108(b) may be movable and the near-end video hub 104(a) may send information that is used by the far-end video hub 106(b) to control the movement of the far-end camera 108(b). In some cases, the near-end video hub 104(a) may control the far-end camera 108(b) to move the view area 116 leftward, rightward, upward, and/or downward relative to the overall scene 114 in order to capture video of the desired view area 116.

An action 310 comprises displaying the view 206 on the near-end display surface 106(a) of the near-end video hub 104(a).

The actions of FIG. 3 are repeated continuously, so that the view area 116 is continuously reselected based on the current near-end viewing angle $\theta_N$. As the actions are repeated, the action 306 may comprise:
- changing the view area 116 leftward relative to the scene 114 in response to a rightward change in the position of the user 110 relative to the near-end display surface 106(a);
- changing the view area 116 rightward relative to the scene 114 in response to a leftward change in the position of the user 110 relative to the near-end display surface 106(a);
- changing the view area 116 upward relative to the scene 114 in response to a downward change in the position of the user 110; and/or
- changing the view area 116 downward relative to the scene 114 in response to an upward change in the position of the user 110.

Figure 4:
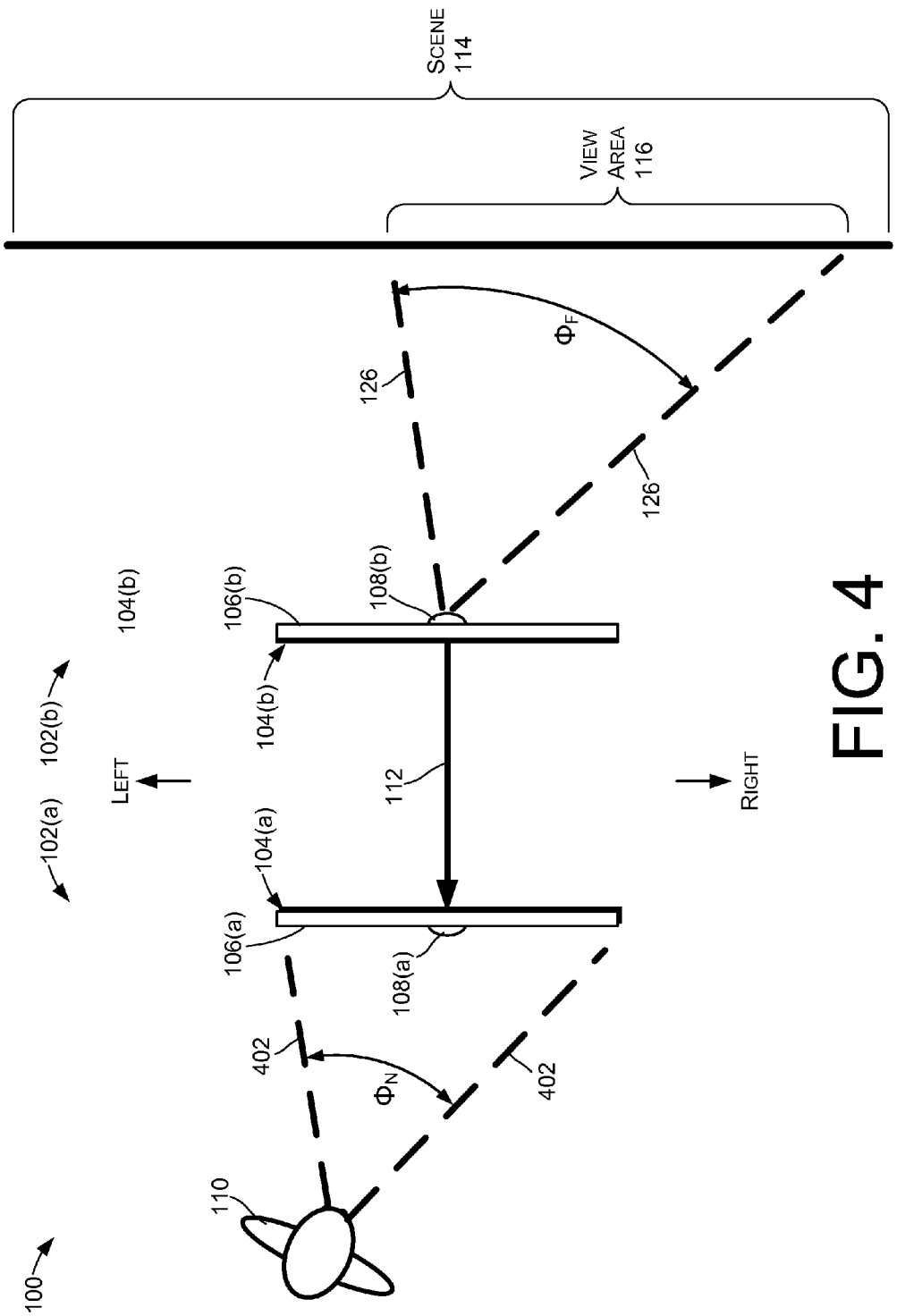
FIG. 4 is a block diagram of the system and environment of FIG. 1, in which the user has moved.

FIG. 4 shows an example similar to that of FIG. 1, where the near-end user 110 has moved leftward, toward the left of the center of the near-end video hub 104(a). The view area 116 has moved rightward, toward the right of the scene 114. The resulting change in the view 206 is displayed on the near-end display surface 106(a) as the user moves. Thus, as the user moves toward the right they will observe the displayed view panning smoothly and continuously toward the left, enabling the user to observe leftward parts of the scene 114. As the user moves toward the left they will observe the displayed view panning smoothly and continuously toward the right, enabling the user to observe rightward parts of the scene 114.

FIG. 4 also illustrates an embodiment in which the far-end FOV angle $\phi_F$ is determined as a function of the position of the user 110 relative to the near-end display surface 106(a). In particular, the far-end FOV angle $\phi_F$ may be calculated as a function of a near-end display angle $\phi_N$ based on the position of the user 110. The near-end display angle $\phi_N$ is the angle between a pair of rays 402 from the position of the user 110 to the lateral edges of the display surface 106. The near-end display angle $\phi_N$ becomes smaller as the distance of the user 110 from the display surface 106(a) increases. The near-end display angle $\phi_N$ becomes larger as the distance of the user 110 from the display surface 106(a) decreases.

The far-end FOV angle $\phi_F$ may be calculated as a linear function of the near-end display angle $\phi_N$, such as by $\phi_F = b\phi_N$, where b is a constant. In some cases, the far-end FOV angle $\phi_F$ may be equal to the near-end display angle $\phi_N$ (i.e., b=1). In some cases, far-end FOV angle $\phi_F$ may be calculated as a non-linear function of the near-end display angle $\phi_N$.

Returning to FIG. 3, the action 306 of FIG. 3 may include changing the size of the view area 116 (and of the corresponding region 204 of the video 112) as a function of the change in the distance of the user 110 from the display surface. More specifically, the action 306 may comprise:
- increasing the size of the view area 116 in response to a change in the position of the user 110 toward the display surface 106(a); and
- decreasing the size of the view area 116 in response to a change in the position of the user 110 away from the display surface 106(a).

In some embodiments, the near-end video hub 104(a) may be configured to send information regarding the currently selected view or view area 116, and the far-end video hub 104(b) may configure the region 204 of the far-end video 112 to have higher quality than other regions of the video 112. For example, the region 204 may be transmitted and received at a higher resolution or frame rate than other regions of the far-end video 112.

In some embodiments, the near-end video hub 104(a) may send information to the far-end video hub 104(b) regarding the near-end viewing angle $\theta_N$, the far-end view angle $\theta_N$, the near-end display angle $\theta_N$, the far-end FOV angle $\phi_F$, and/or other information relating to or derived from the position of the user 110. In response to this information, the far-end video hub 104(b) may perform the cropping or extracting of the region 204 so that the far-end video 112 contains only the desired view 206. With regard to the method 300 of FIG. 3, the action 308 may be performed in this manner.

In yet other embodiments, the far-end camera 108(b) may have a fixed and relatively narrow FOV that corresponds to the far-end FOV angle $\phi_F$, and may be mechanically movable so that it can be panned horizontally across the scene 114. In these embodiments, the near-end video hub 104(a) may be configured to control the direction of the far-end camera 106(b) so that the far-end video 112 contains only the desired view 206. The near-end video hub 104(a) may directly control the movement of the far-end camera 106(b) by communicating with the far-end video hub 104(b). Alternatively, the near-end video hub 104(a) may send information regarding the near-end viewing angle $\theta_N$, the far-end view angle $\theta_F$, or other information relating to or derived from the position of the user 110 so that the far-end video hub 104(b) can position the far-end camera 106(b) in a direction corresponding to the far-end view angle 224. With regard to the method 300 of FIG. 3, the action 308 may comprise controlling the camera in this manner.

Although selecting the view has been described above as being based on a viewing angle of the user, the position or direction of the user relative to the near-end display surface 106(a) may in practice be represented by parameters other than angles. For example, the position of the near-end user 110 may be indicated by parameters representing lateral (right/left) position of the user 110 relative to the near-end video hub 104(a), relative to the near-end camera 108(a), or relative to the near-end display surface 106(a). The position may be indicated by values or parameters other than real-world coordinates, such as camera or display coordinates.

Figure 5:
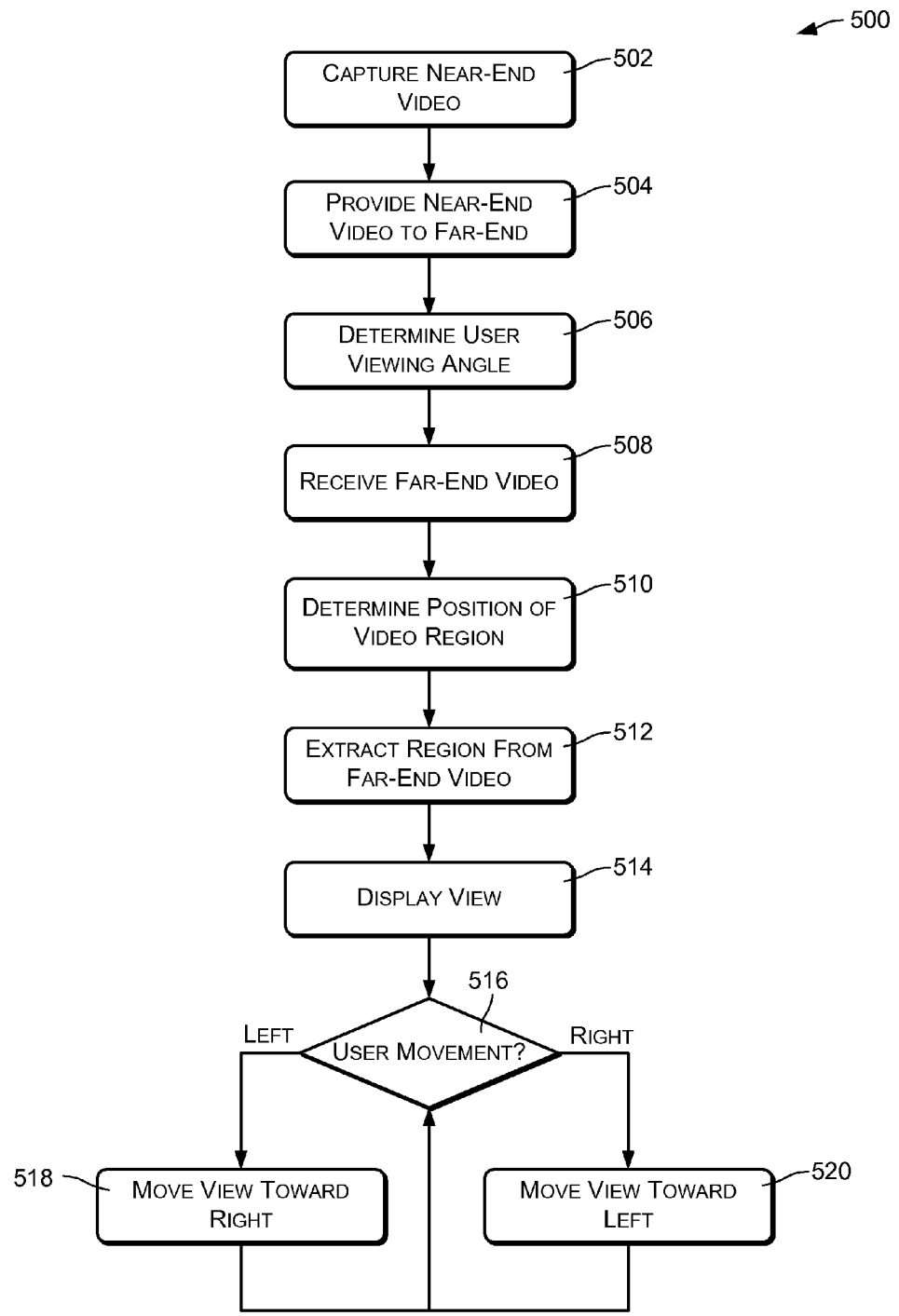
FIG. 5 is a flow diagram illustrating an example method of video conferencing between near-end and far-end sites.

FIG. 5 shows a method 500 of performing video conferencing between a near-end site and a remote far-end site in accordance with the described techniques. The method 500 may be performed by a local or near-end device such as a video hub as described above. For purposes of the following discussion, a device at the near-end site will be referred to as a near-end device and a device at the far-end site will be referred to as a far-end device or remote device. It is assumed that each of the near-end and far-end devices have a display and a video camera, among other components that may be used to facilitate video conferencing. Each device may also have additional sensors, such as imaging devices for determining positions, depths, or distances of objects or surfaces that are within the field-of-view of the device. In particular, each device may have sensors and associated logic for determining an indication of a position of a user relative to the device such as the viewing angle of the user, the distance of the user from the device, the lateral position of the user, etc.

An action 502 comprises capturing, receiving, or producing near-end video of a near-end scene at a near-end site or location. The near-end video represents a moving image and comprises a sequence of images or image frames. Each image frame comprises a two-dimensional array of pixels. Each pixel has one or more values indicating a color of a corresponding point of the scene.

An action 504 comprises providing the near-end video to the far-end device for display of the near-end scene or a portion of the near-end scene on the display of the far-end device. The action 504 may also comprise providing near-end audio to the far-end site.

An action 506 comprises analyzing a video frame of the near-end video to detect a user who is in the first scene, wherein the user is at a viewing angle $\theta_N$ relative to the lateral center of the display surface of the near-end device. In certain embodiments, the near-end viewing angle $\theta_N$ may be defined as discussed with reference to FIG. 1. The action 506 may be performed by analyzing the near-end video to detect a user within the near-end scene and to determine a position and/or viewing angle of the user. In some cases, the near-end viewing angle $\theta_N$ may be represented by the lateral, left/right position of the user relative to the near-end device or to the horizontal center of the near-end device.

Detecting a user and determining the position of the user may be performed using various types of object detection techniques such as face or eye detection techniques. For example, detecting a face or eyes within the near-end video may be performed using a two-dimensional analysis of the frames of the near-end video. Alternatively, face or eye detection may comprise a three-dimensional analysis of three-dimensional scene data such as may be contained in a depth map of the near-end scene. In some implementations of face detection, a surface of an object identified within a 3D depth map is compared to known face geometries to determine whether the object is a face. Eye detection may be based on color analysis, shape analysis, and/or pattern analysis.

An action 508 comprises receiving far-end video from the far-end device, wherein the far-end video comprises a sequence of video frames. In some embodiments, the far-end video may encompass the entire far-end scene.

An action 510 comprises determining the position of a region of the far-end video corresponding to a desired view area of the far-end scene. In some embodiments, the view area and the position of the region may be selected as described with reference to FIGS. 1 and 2, based on the near-end viewing angle $\theta_N$. In some cases, the action 510 may comprise determining the lateral position of the region. In some cases, the action 510 may also include determining the vertical position of the region.

An action 512 comprises extracting the region of each video frame of the far-end video to generate a view video, wherein the region is at the position determined by the action 510 within the video frames of the far-end video. The action 512 may comprise cropping a region of the received far-end video that corresponds to the selected view of the far-end scene. In certain embodiments described above, the cropping may be performed by the near-end device. In other embodiments, the cropping may be performed by the far-end device based on information or instructions from the near-end device. In embodiments in which the far-end camera can be moved, the action 512 may comprise causing the far-end camera to move or pan to the selected view of the far-end scene.

An action 514 comprises displaying the view video on the display surface of near-end device.

An action 516 comprises detecting movement of the near-end user. This may be performed by monitoring or tracking the detected position of the user, the face of the user, or the eyes of the user over time, based on the image analysis and object detection techniques described above.

If user movement in a left-hand direction is detected, an action 518 is performed of horizontally moving or panning the displayed view in a direction toward the right side of the far-end scene. This corresponds to changing the lateral position of the region 204 of FIG. 2 rightward relative to the overall video frame 202.

If user movement in a right-hand direction is detected, an action 520 is performed of horizontally moving or panning the displayed view in a direction toward the left side of the far-end scene. This corresponds to changing the lateral position of the region 204 of FIG. 2 leftward relative to the overall video frame 202.

Figure 6:
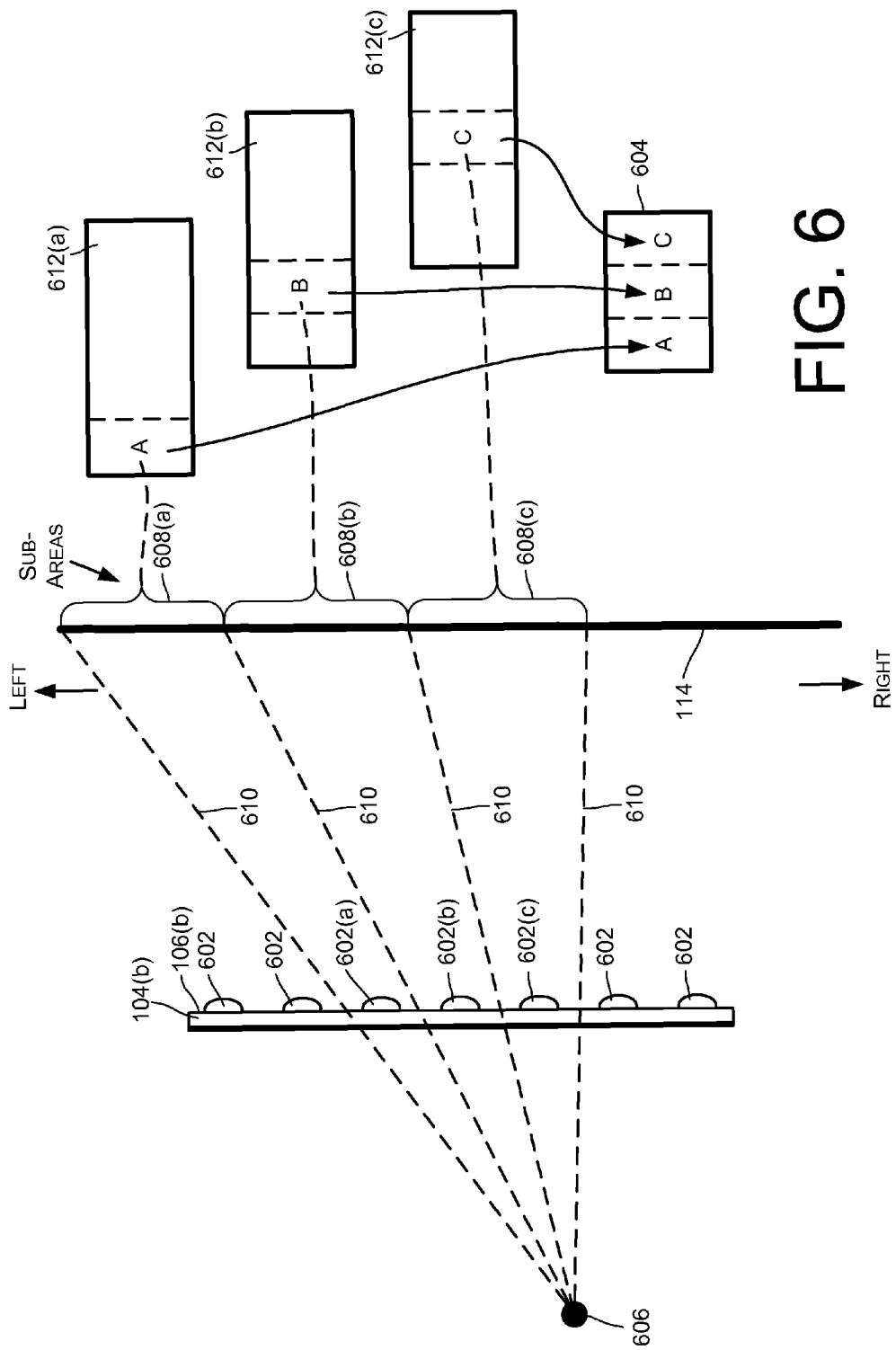
FIG. 6 is a block diagram illustrating an alternative configuration of a far-end device and related techniques that may be used for video conferencing.

FIG. 6 shows an alternative embodiment in which the far-end video hub 104(b) has multiple video cameras 602. The cameras 602 are laterally spaced from each other over the width of the display surface 106(b). Each camera 602 has a different perspective of the scene 114 and an FOV that covers the entire scene 114. A composite view 604 of a view area is created based on regions of the video streams provided by two or more of the multiple cameras 602.

More specifically, the position of a virtual viewpoint 606 is determined based on the position of the user 110 relative to the near-end video hub 104(a). The virtual viewpoint 606 is defined as a point behind the far-end video hub 104(b) at the same distance and angle as the distance and angle of the user 110 center of the near-end video hub 104(a).

In this embodiment, the viewing area of the scene 114 comprises multiple sub-areas 608, shown in FIG. 6 as sub-areas 608(a), 608 (b), and 608 (c). Each sub-area 608 is defined based on rays 610 that are constructed from the virtual viewpoint 606 to the scene 114. Each pair of adjacent rays 610 surrounds a corresponding camera 602. The area of the scene 114 between rays 610 comprises a corresponding sub-area 608. A ray (not shown) that extends from the virtual viewpoint 606 through the center of a camera 602 points to the center of a corresponding sub-area 608.

In this embodiment, a far-end video stream from each of the multiple far-end cameras 602 is provided to the near-end video hub 104(a). In the example of FIG. 6 these include a first video frame 612(a) from a first camera 602(a), a second video frame 612(b) from a second camera 602(b), and a third video frame 612(b) from a third camera 602(c).

At the near-end video hub 104(a), the composite view 604 is formed by selecting a region from each of two or more of the multiple video streams provided from the cameras 602. Specifically, the view 604 comprises a region A of the video frame 612(a), corresponding to the sub-area 608(a) of the scene 114, a region B of the video frame 612(b), corresponding to the sub-area 608(b) of the scene 114, and a region C of the video frame 612(c), corresponding to the sub-area 608(c) of the scene 114.

As the user moves, the rays 610 and the corresponding sub-areas 608 are recalculated so that the composite view 604 moves over the scene 114 in response to user movement. Regions of video streams from different sets of the cameras 602 may be used to form the view 604 depending on the position of the user 110 and the corresponding virtual viewpoint 606.

Figure 7:
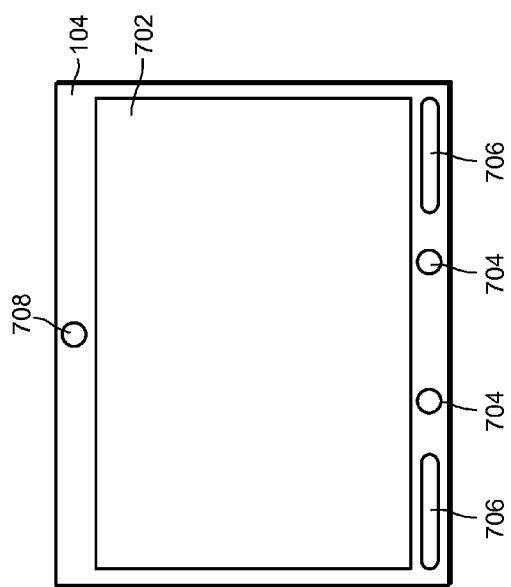
FIG. 7 is a front view of an example video hub.

FIG. 7 shows an example configuration of a video hub 104. The video hub 104 may have a color, flat-panel display 702 such as an LED (light-emitting diode) display or similar display capable of displaying graphical images, including pictures, still images, animations, video, user interfaces, and other graphics. The display 702 may be touch-sensitive so that a user can select controls and interact by touching the display 702 with a finger or stylus.

The video hub 104 may have one or more microphones 704 and one or more speakers 706. The video hub 104 may also have one or more integrated cameras 708. In some embodiments, the cameras 708 may have a relatively wide field-of-view (FOV) such as 140 to 160 degrees.

Figure 8:
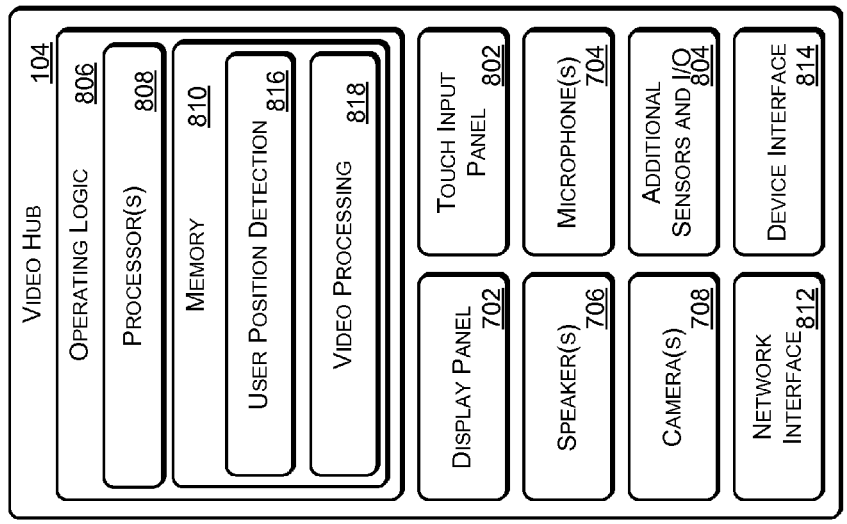
FIG. 8 is a block diagram of the example video hub.

FIG. 8 shows additional relevant components of the video hub 104 in an example implementation. The video hub 104 may comprise the color display panel 702 as already mentioned. The display panel 702 may have an integrated touch input panel 802, allowing the video hub 104 to respond to user touch. The display panel 702 and the touch input panel 802 may be used in conjunction with each other to implement a touch-based graphical user interface, wherein the user may provide input and responses by touching controls that are graphically displayed on the display panel 702.

The video hub 104 may also have one or more microphones or microphone arrays 704 and one or more speakers 706 as described above. The speakers 706 may be used to play audio in conjunction with video that is displayed on the display panel 702. The microphones 704 may be used to capture audio from the environment of the video hub 104 including user speech.

The video hub 104 may also have one or more cameras 708 for capturing images and/or video from the nearby environment. The cameras 708 may include a visible light camera that produces video of a scene for transmission to another video hub. For example, a visible light camera may comprise a color camera that produces video representing visible attributes of the scene.

The cameras 708 may also include other types of cameras that produce images that can be analyzed to detect a user within the scene and to determine the position and/or view angle of the user. For example, the cameras 708 may include a depth camera, also referred to as a depth sensor, that produces depth images of the scene. A depth image, also referred to as a depth map or 3D point cloud, indicates distances or depths of surface points within the scene. The cameras 708 may include visible light cameras, infrared cameras, time-of-flight cameras or sensors, proximity sensors, structured light systems, stereoscopic cameras, and other types of camera or sensors.

The display panel 702, the speakers 706, the microphones 704, and the cameras 708 may be used with each other to implement the video conferencing techniques described herein, which allow near-end users to communicate verbally and visually with far-end users through both sound and video. The display panel 702 and cameras 708 may be used to display far-end video and to capture near-end video, respectively, while the speakers 706 and the microphones 704 may be used to reproduce far-end audio and to capture near-end audio, respectively.

The video hub 104 may have various additional input and output components or capabilities 804, which may include keyboards, virtual keyboards, infrared cameras or sensors, proximity sensors, projectors, annunciators, indicators, and so forth, which may allow various additional functionalities and methods of user interaction.

The video hub 104 may have operating logic 806 that implements various functionality as will be described herein. The operating logic 806 may be implemented by one or more processors 808 configured to execute software from associated memory 810. Software stored in the memory 810 may comprise programs, program modules, routines, functions, objects, data structures, etc., which are executable by the processors 808. The one or more processors 808 may comprise processor cores. The one or more processors 808 may also comprise or include digital signal processors, co-processors, processor extensions, special-purpose processors, etc.

The memory 810 may comprise computer-readable storage media ("CRSM"), which may be any available physical media accessible by the one or more processors 808 to execute instructions stored on the memory. In one basic implementation, CRSM may include random access memory ("RAM") and flash memory. In other implementations, CRSM may include, but is not limited to, read-only memory ("ROM"), electrically erasable programmable read-only memory ("EEPROM"), or any other medium which can be used to store the desired information and which can be accessed by the processor 808, including rotating media, magnetic media, optical media, and so forth. The CRSM may also include storage media such as CDs (compact disks) DVDs (digital versatile disks), and flash drives that are used to store, transfer, and distribute software.

The video hub 104 may have a network interface 812 for connection to a local-area network and/or wide-area network. For example, the network interface 812 may allow the video hub 104 to communicate through a public network such as the Internet. The network interface 812 may comprise a wireless network interface such as a WiFi® interface, which may be configured to connect though a local wireless access point in order to connect to the Internet. In some cases the network interface 812 may comprise a cellular data interface.

The video hub 104 may also have a local, wireless, device-to-device interface 814 such as a Bluetooth® interface. The device-to-device interface 814 may allow the video hub to utilize and interact with local user devices such as smartphones, media devices, headsets, remote speakers, remote microphones, and so forth.

Among other types of software that are not show in FIG. 8, the memory 810 may include a user tracking system or component 816 that analyzes images produced by the one or more cameras 708 to determine the viewing angle of the user. The user tracking system 816 may have two-dimensional (2D) analysis capabilities for receiving and analyzing 2D images of a scene captured by an optical or color image camera. The 2D analysis capabilities may analyze sequential image frames of near-end video to determine positions, distances, and/or movements of user body parts such as faces and eyes.

The user tracking system 816 may further include three-dimensional (3D) analysis functionality that is responsive to data received from sensors of the video hub 104 to detect and determine the position of the user. For example, the 3D analysis functionality may receive depth information, such as a depth-map or three-dimensional image of a scene at the near-end site that contains the user. Depth maps may be created using various components and techniques, including structured light projection and analysis, stereoscopic image analysis, optical time-of-flight analysis, acoustic analysis, and so forth. Illumination of a scene for purposes of capturing images may be accomplished using ambient light and/or infrared/non-visible light.

In some cases, 2D and 3D analysis capabilities may be used in conjunction with each other to detect a user and to determine the position or viewing angle of the user.

Information produced by the cameras 708 may be used to detect the presence of the near-end user and to determine the position and/or viewing angle of the near-end user. For example, captured images may be analyzed to detect the face of a user or to detect the eyes of the user. Audio analysis, such as sound source localization (SSL), may also be used in some implementations to determine the position or view angle of the user.

Although techniques have been described above in the context of a video hub or video conferencing device, similar techniques may be used in other devices such as personal computers, media devices, smartphones, tablet computers, mobile devices, and so forth.

Although the subject matter has been described in language specific to certain features, it is to be understood that the subject matter defined in the appended claims is not necessarily limited to the specific features described. Rather, the specific features are disclosed as illustrative forms of implementing the claims.

What is claimed is:

1. A first device, comprising:
 a video camera configured to operate from a first site to produce first video of a first scene, wherein the first video comprises a first sequence of video frames;
 a display surface having a lateral center, the display surface having a right and a left from a perspective of a user facing the display surface;
 operating logic configured to perform acts comprising:
 providing the first video to a second device for display by the second device,
 wherein the second device is at a second site;
 receiving second video of a second scene from the second device, wherein the second video comprises a second sequence of video frames;
 analyzing a first video frame of the first video to detect a user who is in the first scene, wherein the user is at a viewing angle relative to the lateral center of the display surface, the viewing angle being defined by a first ray and a second ray, the first ray extending from the lateral center of the display surface to the user, the second ray extending orthogonally from the lateral center of the display surface;
 extracting a region of each video frame of the second video based at least in part on the viewing angle to create an extracted region for each video frame;
 analyzing a second video frame of the first video to detect a change in the viewing angle;
 based at least in part on analyzing the second video frame, generating third video, the generating comprising at least one of:
 determining to position each extracted region for each frame at leftward regions within each video frame in response to the change in the viewing angle being toward the right of the display surface; or
 determining to position each extracted region for each frame at rightward regions within each video frame in response to the change in the viewing angle being toward the left of the display surface; and
 causing the third video to be displayed on the display surface.

2. The first device of claim 1, further comprising continuously moving each extracted region within each video frame in response to movement of the user relative to the display surface.

3. The first device of claim 1, wherein each extracted region has a size, the acts further comprising changing the size of each extracted region as a function of a change in a distance of the user from the display surface.

4. The first device of claim 1, wherein:
 the region is at a vertical position within each video frame;
 the display surface has a top and a bottom; and
 the acts further comprise (a) moving each extracted region for each frame upward relative to the region in each video frame in response to a change in the viewing angle toward the bottom of the display surface and (b) moving each extracted region for each frame downward relative to the region in each video frame in response to a change in the viewing angle toward the top of the display surface.

5. A device for operation at a first site, comprising:
 a display;
 a user tracking system configured to detect a position of a user relative to the display;
 operating logic configured to perform acts comprising:
 receiving video that represents a scene of an environment of a second site;
 causing the video that represents the scene to be presented on the display;
 determining, based at least in part on the position, an area of the scene corresponding to a viewing angle of the user, the area of the scene corresponding to a portion of the video presented at a first region of the display;
 extracting the portion from the video to create an extracted portion of the video;
 detecting a change in the position of the user relative to the display;
 based at least in part on determining the change in the position comprises a rightward change in the position from a perspective of the user:

determining a second region of the display leftward relative to the first region from the perspective of the user; and causing the extracted portion to be displayed at the second region of the display; and based at least in part on determining the change in the position comprises a leftward change in the position from the perspective of the user:

determining a third region of the display rightward relative to the first region from the perspective of the user; and causing the extracted portion to be displayed at the third region of the display.

6. The device of claim 5, wherein the position comprises one or more of:
a lateral position of the user relative to the display;
a distance of the user from the display; or
an angular position of the user relative to the display.

7. The device of claim 5, the acts further comprising causing the extracted portion of the video to be presented at a fourth region positioned vertically relative to the first region of the display in response to a vertical change in the position.

8. The device of claim 5, the portion of the video having a size on the display, the acts further comprising changing the size of the portion of the video in response to a change in the position toward or away from the display.

9. The device of claim 5, the acts further comprising cropping the received video to create the extracted portion of the video.

10. The device of claim 5, the acts further comprising controlling a camera that is at the second site to move the area leftward and rightward.

11. The device of claim 5, the acts further comprising selecting from multiple cameras at the second site to cause the extracted portion of the scene to be displayed at the second region or the third region.

12. The device of claim 5, wherein the received video includes multiple video streams produced respectively by multiple cameras at the second site, the multiple cameras having respectively different perspectives of the scene, the acts further comprising selecting the first region from each of two or more of the multiple video streams to determine the portion of the video.

13. The device of claim 5, the acts further comprising causing the first region of the received video to be received at a higher resolution or frame rate than a second region of the received video, wherein the first region corresponds to the portion.

14. A method, comprising:
detecting, by one or more sensors of a computing device, a first position of a user relative to a display surface, wherein the display surface is at a first site;
receiving video that represents a scene of an environment of a second site;
causing the video that represents the scene of the environment of the second site to be presented on the display surface;
determining, based at least in part on the first position, an area of the scene corresponding to a first viewing angle of the user;
identifying a portion of the video corresponding to the area of the scene, the portion of the video being presented at a first region of the display surface;
detecting, by the one or more sensors, a change in position of the user from the first position to a second position relative to the display surface;
extracting the portion of the video from the video to create an extracted portion of the video;
determining, based at least in part on the second position, a second viewing angle of the user;
determining, based at least in part on the second viewing angle, a second region of the display surface at which to place the extracted portion of the video, wherein determining the second region comprises at least one of:
determining that the second region is leftward relative to the first region in response to detecting a rightward change in the position relative to the display surface; or
determining that the second region is rightward relative to the first region in response to detecting a leftward change in the position relative to the display surface; and
causing the extracted portion of the video to be presented at the second region of the display surface.

15. The method of claim 14, wherein the first position comprises one or more of:
a lateral position of the user relative to the display surface;
a distance of the user from the display surface; or
an angular position of the user relative to the display surface.

16. The method of claim 14, wherein determining the second region of the display surface at which to place the extracted portion of the video further comprises determining that the second region is located horizontally relative to the first region in response to lateral movement of the user relative to the display surface.

17. The method of claim 14, wherein determining the second region of the display surface at which to place the extracted portion of the video further comprises determining that the second region is located vertically relative to the first region in response to vertical movement of the user.

18. The method of claim 14, the extraction portion having a size, wherein causing the extracted portion of the video to be presented at the second region comprises changing the size of the extracted portion in response to a change in the position toward or away from the display surface.

19. The method of claim 14, further comprising cropping the video to produce the extracted portion of the video.

\* \* \* \* \*